United States Patent
Teofili et al.

(10) Patent No.: US 11,487,709 B2
(45) Date of Patent: **\*Nov. 1, 2022**

(54) DOCUMENT REPLICATION BASED ON DISTRIBUTIONAL SEMANTICS

(71) Applicant: ADOBE INC., San Jose, CA (US)

(72) Inventors: Tommaso Teofili, Rome (IT); Antonio Sanso, Duggingen (CH)

(73) Assignee: ADOBE INC., San Jose, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 16/779,214

(22) Filed: Jan. 31, 2020

(65) Prior Publication Data

US 2020/0167317 A1 May 28, 2020

Related U.S. Application Data

(63) Continuation of application No. 15/282,388, filed on Sep. 30, 2016, now Pat. No. 10,614,043.

(51) Int. Cl.
| | |
|---|---|
| *G06F 16/178* | (2019.01) |
| *H04L 67/1095* | (2022.01) |
| *H04L 67/1097* | (2022.01) |
| *G06F 16/182* | (2019.01) |
| *G06F 16/93* | (2019.01) |
| *G06N 3/04* | (2006.01) |

(52) U.S. Cl.
CPC ........ *G06F 16/178* (2019.01); *G06F 16/1844* (2019.01); *H04L 67/1095* (2013.01); *H04L 67/1097* (2013.01); *G06F 16/93* (2019.01); *G06N 3/04* (2013.01)

(58) Field of Classification Search
CPC .... G06F 16/178; G06F 16/1844; G06F 16/93; H04L 67/1097; H04L 67/1095; G06N 3/04

See application file for complete search history.

(56) References Cited

U.S. PATENT DOCUMENTS

| | | | | |
|---|---|---|---|---|
| 5,806,065 | A | * | 9/1998 | Lomet ............... G06F 17/30327 |
| | | | | 707/610 |
| 9,852,337 | B1 | * | 12/2017 | van Rotterdam .... G06V 30/416 |
| 2004/0230615 | A1 | * | 11/2004 | Blanco .............. G06F 17/30575 |
| 2007/0143357 | A1 | * | 6/2007 | Chaudhri .......... G06F 17/30017 |

(Continued)

*Primary Examiner* — Aleksandr Kerzhner
*Assistant Examiner* — Maher N Algibhah
(74) *Attorney, Agent, or Firm* — Shook, Hardy & Bacon, LLP (57) ABSTRACT

Embodiments of the present invention are directed toward systems, methods, and computer storage media for using a neural network language model to identify semantic relationships between file storage specifications for replication requests. By treating file storage specifications (or at least a portion thereof) as "words" in the language model, replication vectors can be determined based on the file storage specifications. Instead of determining the relationship of the file storage specifications based on ordering within a document, the relationship can be based on proximity of the replication requests in a replication session. When a replication request is received from a user, the replication vectors can be used to determine a semantic similarity between the received replication request and one or more additional replication requests.

10 Claims, 7 Drawing Sheets

(56) References Cited

U.S. PATENT DOCUMENTS

| | | | |
|---|---|---|---|
| 2009/0271412 A1* | 10/2009 | Lacapra | G06F 17/30206 |
| 2010/0275200 A1* | 10/2010 | Radhakrishnan | G06F 9/452 |
| | | | 718/1 |
| 2012/0330892 A1* | 12/2012 | Benjamin | G06F 17/30212 |
| | | | 707/622 |
| 2013/0124464 A1* | 5/2013 | Rank | G06F 17/30575 |
| | | | 707/610 |
| 2013/0325950 A1* | 12/2013 | Laden | H04L 67/1095 |
| | | | 709/204 |
| 2014/0223480 A1* | 8/2014 | Berry | H04N 21/4668 |
| | | | 725/40 |
| 2015/0134723 A1* | 5/2015 | Kansal | H04L 67/1031 |
| | | | 709/203 |
| 2016/0196324 A1* | 7/2016 | Haviv | G06F 17/30598 |
| | | | 707/626 |
| 2017/0147672 A1* | 5/2017 | Arnold | G06F 17/30581 |
| 2017/0270100 A1* | 9/2017 | Audhkhasi | G06F 17/28 |

* cited by examiner

DOCUMENT REPLICATION BASED ON DISTRIBUTIONAL SEMANTICS

CROSS-REFERENCE TO RELATED APPLICATIONS

This application is a continuation of and claims priority to U.S. patent application Ser. No. 15/282,388, filed Sep. 30, 2016 which is herein incorporated by reference in its entirety.

BACKGROUND

Replication of documents across a network can be a resource intensive process. When a content creator generates new content and/or an update for existing content, such as by using an author instance or server instance of a content management tool, it can be desirable to replicate that new content to various publish instances or other clients. ADOBE EXPERIENCE MANAGER is an example of a content management tool. Conventionally, document replication can be performed by having the content creator (such as an author instance of a content management tool) replicate each of the documents on a client (such as a publish instance of a content management tool), leading to a separate network communication session between the server and each client for each document that is replicated. In addition to being a tedious process for the content creator, the amount of network traffic to perform these replications can increase rapidly if there are a large number of clients.

One alternative to individual replication of documents by a user can be to use rules to automatically select documents for replication. While rule-based replication may be convenient for replication of an entire corpus of documents and/or for replication of exactly the same documents multiple times, it can be difficult to generate sufficient numbers of rules to account for all of the different types of minor updates that might be desirable. Additionally, not all users are comfortable with developing complex rules to handle specific replication situations. Moreover, these traditional methodologies can consume excessive amounts of network bandwidth or computing resources (e.g., processing power), particularly when rules are poorly designed or are over-reaching.

SUMMARY

Embodiments of the present invention are directed towards using a first replication request to identify additional replication requests for suggestion to a user. In particular, embodiments of the present invention are directed toward systems, methods, and computer storage media for using a neural network language model to identify semantic relationships between file storage specifications for replication requests. By treating file storage specifications (or at least a portion thereof) as "words" in the language model, replication vectors can be determined based on the file storage specifications. Instead of determining the relationship of the file storage specifications based on ordering within a document, the relationship can be based on proximity of the replication requests in a replication session. When a replication request is received from a user, the replication vectors can be used to determine a semantic similarity between the received replication request and one or more additional replication requests.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

Neural network language models have previously been developed to model words as vectors. The vectors can then be used to determine semantic relationships between words and/or to predict words likely to appear in a document in proximity to a given initial word. Such language models could be applied to the content of documents for replication, such as text within a document or metadata associated with a document. While this could allow for determination of documents that have related content, the documents that a user may desire to replicate as a group are not necessarily related in a specific way with regard to content. To this end, replication could potentially lead to wasted resources, by unnecessarily utilizing excessive bandwidth and valuable processing resources as a result of over-reaching rules. Thus, a straightforward application of neural network language models to the content of replicated documents is unlikely to lead to substantial improvement in predicting which documents a user would like to replicate during a replication session and/or which documents are the most relevant for replication to facilitate an optimal utilization of resources.

Instead of applying a neural network language model to only the content of documents, in various aspects a neural network language model can be used to determine semantic relationships between the file storage specifications for documents during replication sessions. As noted below, a file storage specification can correspond to an absolute or relative specification for the location of a document. The semantic analysis of documents can be based only on the file storage specifications, or the semantic analysis can also consider traditional forms of document content, such as text within a document and/or metadata associated with a document.

In order to perform semantic analysis of file storage specifications for documents, it has been discovered that a modified type of neural network language model can be used. First, the nature of the "words" used in the model can be modified to correspond to file storage specifications or portions thereof. Another modification can be related to determining the "proximity" of replication requests. In a conventional neural network language model, proximity of words in a document is based on the location (ordering) of words in the document. There is no temporal component to proximity. By contrast, the modified neural network language models described and used herein can use proximity in time as the primary proximity measure. For example, replication requests received within a time window, such as a rolling time window or a fixed time window, can be considered as potentially related. If the time-based proximity definition corresponds to a sufficiently long period of time, proximity based on the order in which replication requests are entered can optionally be considered.

During an initial phase, the modified neural network language model can be trained based on received replication requests. Replication requests that are received during a session that are sufficiently close in time can be considered as related requests. The neural network language model can learn relationships between replication requests based on the proximity in time until a sufficient amount of replication requests have been analyzed. The model can then be used to predict additional desired replication requests based on an initial received request.

Definitions

In this discussion, a file storage specification is defined as a character string that can be used by an operating system to uniquely identify the location of a document or other file. A file storage specification can correspond to a full specification or a relative specification. A full specification corresponds to a file storage specification that can be used to determine a document location without reference to a stored or current location value. For example, this can correspond to a file path length starting with a disk label (such as "C:/apps/helper"), an "http" type address, or another type of file location. It is noted that a full specification may rely on use of default values. For example, a file system may automatically assume that a document is located on the "C:" drive unless otherwise specified. For such a file system, just specifying the directory tree for a document would correspond to a full specification. By contrast, for a relative specification, an additional portion of the address can be provided by the operating system. This could correspond to using a current directory (or another specified directory) as a starting point for a relative file specification. Another type of relative specification can correspond to a specification where a file system has a series of potential default completion options, and checks the default completion options in a specified order until a matching document is detected. In various aspects, a file storage specification can represent a location corresponding to one or more of a location on tangible media, a location in or on non-transitory media, a location in or on computer memory media, a location in or on computer-readable media, and a location in or on computer memory media.

In this discussion, a document is defined as a file or other content-containing item that is stored at a location corresponding to a file storage specification. Examples of documents can include, but are not limited to, web pages, document editing and/or display files (such as files associated with a word processing application, a spreadsheet application, or a portable document format application), images, videos, and/or audio files. In some aspects, a document may be composed of and/or include one or more other documents. For example, a web page may include images, videos, embedded document editing and/or display files, or other types of content-containing items that can have a distinct file storage specification from the web page.

File Storage Specification as a Word in a Language Model

In various aspects, semantic analysis can be performed on replication requests in a publishing environment by treating the file storage specification portion of a replication request as a word in a language model. In some aspects, the treatment of a file storage specification as a word can be based on the file storage specification as provided in the replication request. Additionally or alternately, the treatment of the file storage specification as a word can be based on an expanded file storage specification. For example, the file storage specification as entered can be expanded to include implied portions. Another example can be to expand a relative specification to include portions that are tried in a sequential order to determine a suitable initial portion and/or final portion for the file storage specification. Additionally or alternately, the treatment of the file storage specification as a word can be based on using a portion of the file storage specification as provided.

During training of a language model, the relationship between file storage specifications can be based on proximity in time. One option for determining proximity in time can be based on time windows. When an initial replication request is received, the beginning of a time window can be defined. A time window can have any convenient length, such as 1 minute, 5 minutes, 10 minutes, 30 minutes, or another convenient amount up to several hours or more or down to as little as 10 seconds or less. Any replication requests received within the time window can be treated as being semantically related. After the end of the time window, if another replication request is received, another time window can be defined.

Another option for determining proximity in time can be to use rolling time windows. As an example, each replication request can be used to define the beginning of a new time window. This means that multiple time windows for determining semantically related replication requests may be open at the same time. Each time window can then be used as an example of semantically related replication requests for training the language model. Still another option can be to allow a threshold amount of time to pass before opening a second time window. For example, after an initial replication request is received, a first time window can be opened. In this example, the length of the time window can be one minute. A threshold time for the time window can be 20 seconds. If additional replication requests are received within 20 seconds of the initial request, new time windows are not opened. A request received between 20 seconds and 1 minute can result in a replication request that is counted within the initial time window and that is also counted in a second time window. Still other options for defining time windows based on received replication requests will be apparent to those of skill in the art.

Optionally, proximity of requests within a given time window can also be used as part of determining the semantic relationship between replication requests. When multiple requests are received within a time window, the ordering of the requests can also be tracked. The ordering of requests can be used for determining semantic relationships in a manner similar to how word ordering is used for semantic relationships within a document.

As an example, during a replication session, a user may provide commands (replication requests) via a user interface to perform replications on documents having the following file storage specifications: 1) /a/b; 2) /e/c; 3) /a/d. These replication requests can be received within a set time window, such as within 1 minute, so that the three file storage specifications are considered as related to each other. These relationships can be expressed as:

/a/b=>/e/c,/a/d

/a/d=>/e/c,/a/b

/e/c=>/a/b,/a/d

When the above relationships are received by the neural network language mode, the replication vectors for the file storage specifications "/a/b", "/a/d", and "/e/c" can each be updated. Replication vectors are "word-vectors", corresponding to the vector representation of a word within the neural network language model. After the update, the scalar product (such as a cosine similarity) of the replication vector corresponding to "/a/b" with the replication vector corresponding to "/a/d" can have a higher value than prior to when the above additional relationship was used for training the model. In other words, the above replication session data set can train the model so that the word-vectors corresponding to the file storage specifications in the replication session are more similar.

In the above example, equal weights for similarity were given to each of the replication vectors related to the replication session. In alternative aspects, the ordering of replication requests in a replication session can be used to vary the similarity weights for replication vectors related to a session. In the above example, the order of receiving the replication requests (as noted by the corresponding file storage specifications) was: 1)/a/b; 2)/e/c; 3)/a/d. Based on this ordering, a higher similarity weight can be given to /a/b with /e/c, and to /e/c with /a/d. A lower similarity weight can be given to /a/b with /a/d, based on the separation of the corresponding replication requests within the replication session.

The above training can be repeated based on file storage specifications collected over a large number of replication sessions. The sequences of relationships can then be streamed to a neural network language model, such as a continuous skip-gram model, to produce word-vectors for each file storage specification (i.e., replication vectors). The replication vectors can then be stored. After the training period, when a new replication request is received, the file storage specification (or at least a portion thereof) can be extracted from the new replication request. The extracted file storage specification can be used to determine if a corresponding stored replication vector exists. It is noted that multiple stored replication vectors may correspond to an extracted file storage specification. For example, a replication request for a new document stored in an otherwise existing portion of a hierarchical storage structure may not result in a match for the full file storage specification. However, truncating the extracted file storage specification to exclude the final node specification, such as truncating to specify just the directory the file is located in, may result in a matching stored replication vector. In this type of situation, the truncated file storage specification can be used for purposes of determining a matching replication vector.

The other previously stored replication vectors can then be used to form scalar products with a replication vector corresponding to the (at least a portion of the) extracted file storage specification. If any previously stored word-vectors are sufficiently similar to the replication vector for the extracted file storage specification, additional replication requests can be suggested to the user. One option for determining sufficient similarity can be to select previously stored replication vectors that have a scalar product with the extracted replication vector of at least a threshold value. Optionally, when a truncated file storage specification is used to determine the replication vector, a higher scalar product threshold can be required for identifying other sufficiently similar stored replication vectors.

The above provides a method for determining a scalar product for stored replication vectors based on a single received file storage specification. This can correspond to, for example, a situation where additional replication requests are provided after receiving an initial replication request from a user. More generally, additional replication requests may be provided at any time within a replication session. In some aspects, a plurality of replication requests may be received from a user, and then the use may select from additional suggested replication requests that are determined based on the plurality of received replication requests. This may occur because the user does not interact with the suggested replication requests until after two or more are provided by the user; or may occur because the initial replication request does not result in any scalar products that are greater than a threshold value (i.e., no suggested replication requests after receiving the initial replication request); or may occur for any other convenient reason. When additional replication requests are suggested based on a plurality of received replication requests, the additional replication requests can be determined in any convenient manner based on the plurality of requests. This can include selecting stored word-vectors that have scalar products greater than a threshold value with the replication vectors corresponding to each of the received replication requests; selecting stored replication vectors based on a sum of the scalar products with the replication vectors corresponding to each of the received replication requests; selecting replication word vectors that have greater than a threshold value with the word-vectors corresponding to any one of the received replication requests; or another convenient method.

In some optional aspects, if a plurality of previously stored replication vectors have sufficient similarity, the number of suggested replication requests can be limited. One alternative for limiting the number of suggested replication requests can be to present replication requests having the highest corresponding scalar products up to a desired limit, such as the replication requests corresponding to the twenty highest scalar products. Another option can be to analyze the file storage specifications corresponding to scalar products greater than the threshold value. If a plurality of the file storage specifications have a portion of the file storage specification in common, a replication request based on the common portion of the file storage specification can be presented to the user instead of presenting the plurality of individual file storage specifications.

After presenting the additional replication requests to a user, a user may select one or more of the additional replication requests. The one or more additional selected replication requests can then be combined with the initial replication request to form a combined replication request that specifies a plurality of file storage specifications. This combined replication request can then be used to replicate documents to a client or publish instance. Using a combined replication request can allow the replication of multiple documents to be performed in a single connection session between server and client, which can reduce network load and/or use of other computing resources. This can provide additional benefits in situations where a large number of clients receive replicated documents from one or more servers.

In some aspects, the word-vectors produced by analysis of relationships between file storage specifications can have the property that addition and/or subtraction of word-vectors can be used to produce a new word-vector, where the new word-vector is closest in value (as determined by cosine similarity) with the word-vector that would be expected based on semantics. For example, Europa is a moon of the planet Jupiter. Based on semantic relationships, the vectors for Europa, Jupiter, Earth, and the Moon can roughly satisfy the following relationship in Equation (1).

$$\text{Vector(Europa)}-\text{Vector(Jupiter)}+\text{Vector(Earth)}\sim\text{Vector(Moon)} \quad (1)$$

It is noted that Equation (1) represents the expected semantic relationship based on the definitions of the various solar system bodies. In various aspects, semantic analysis of file storage specifications is not dependent on any particular language being used in a hierarchical data structure. Instead, the semantic relationships between replication requests can be learned based on the frequency of appearances in common for file storage specifications within a time window in a replication session.

Any convenient type of neural network language model can be adapted in the manner described herein to use file storage specifications from replication requests as words for determining semantic relationships. An example of a suitable type of language model can be a model that represents words as vectors. In this type of model, each word can be represented by a vector. By representing each word as a vector, similarities between words can be identified based on determining a vector scalar product between the vectors. After generating the vector representation, the model can be used to identify related replication vector(s) based on an input replication request from a user. A log-linear classifier can be a suitable type of model for generating additional replication requests based on a first received replication request.

Optionally, metadata associated with documents can also be used as part of determining semantic relationships between replication requests. Some types of metadata associated with a document, such as content tags, can correspond to a relatively small number of additional words. During training of the model, the model can also consider the metadata associated with documents that are the subject of a replication request.

Optionally, content within a document can also be used as part of determining relationships between replication requests. As noted above, language models based on a conventional dictionary of words have been previously developed. Based on these types of language models, the content of a document corresponding to a replication request can be analyzed. This can potentially allow for identification of documents with similar subject matter as candidates for replication. In this type of aspect, suggesting a replication request may require consideration of two separate threshold values. A first threshold value can correspond to whether two replication requests are sufficiently semantically related, while a second threshold value can correspond to whether two replication requests correspond to documents with sufficiently similar subject matter.

Figure 1:
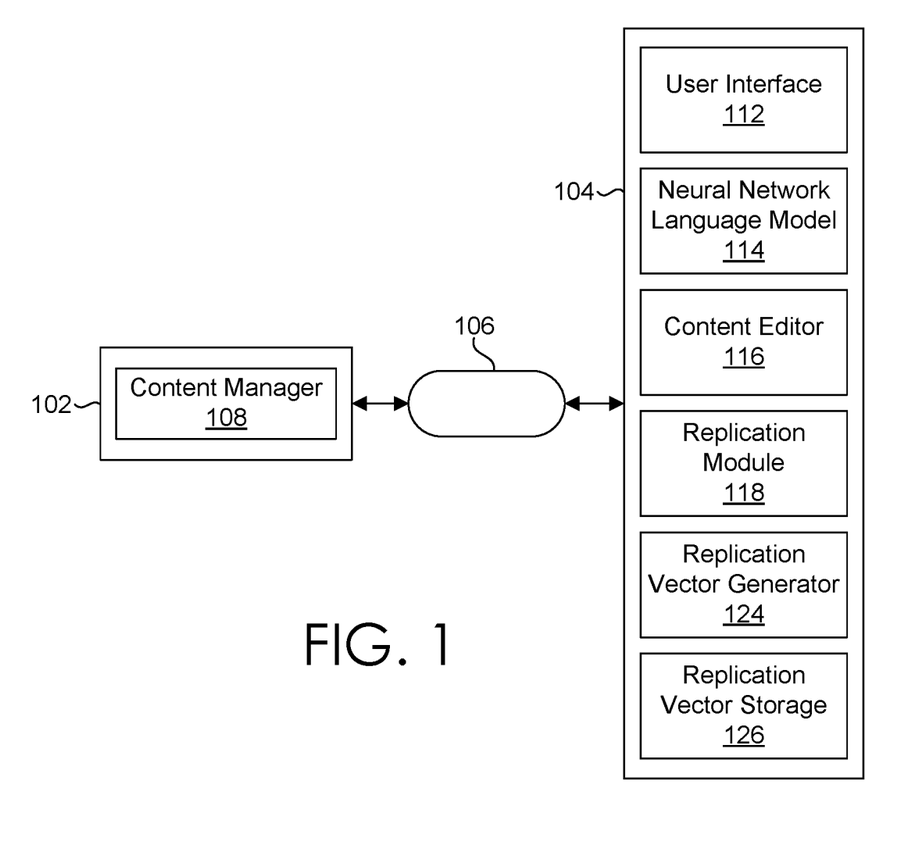
FIG. 1 depicts an example of a content management tool including a neural network language model.

FIG. 1 shows an example of a content management environment. FIG. 1 shows examples of a user device 102 (such as a "publish instance") and a server 104 (such as an "author instance"). User device 102 and server 104 are connected via a network 106. More generally, multiple user devices 102 and/or servers 104 can be part of the network, so that multiple servers can potentially provide content updates and multiple clients can receive such updates. Network 106 can be any convenient type of network, such as a wide area network, a private and/or enterprise network, or a public network.

Server 104 can include a user interface 112, a neural network language model 114, a replication vector generator 124, replication vector storage 126, a content editor 116, and a replication module 118. During an initial training period, when an author wants to generate new content or modify existing content, the new content and/or modified content can be produced using content editor 116. Portions of the new content and/or modified content can then be replicated using replication module 118. A user can enter one or more replication requests using user interface 112. The replication requests received from a user can be organized into one or more time windows by neural network language model 114. The replication requests can also be analyzed by word-vector generator 124 to generate and/or update vectors based on the "words" corresponding to file storage specifications that are extracted from the replication requests. The word-vectors determined based on the "words" for file storage specifications can be stored in word-vector storage 126 for later comparison.

After training of the neural network language model and/or generation and storage of a sufficient number of prior word-vectors based on file storage specifications from replications requests, the system can be used to generate or suggest replication requests based on a replication request received from a user (or otherwise received by the system). When an author wants to generate new content or modify existing content, the new content and/or modified content can be produced using content editor 116. Portions of the new content and/or modified content can then be replicated. The user can enter a replication request using user interface 112. The neural network language model 114 can then generate additional semantically related replication requests and/or additional content-related replication requests. This can be done, for example, by comparing a word-vector for (at least a portion of) the file storage specification of the received replication request with word-vectors stored in word-vector storage 126. After optional user selection of a portion of the additional replication requests (such as optionally up to all suggested additional replication requests), the replication module 118 can initiate replication of selected content at user devices 102. This can be received, for example, by a content manager 108 at the user devices 102.

Figure 2:
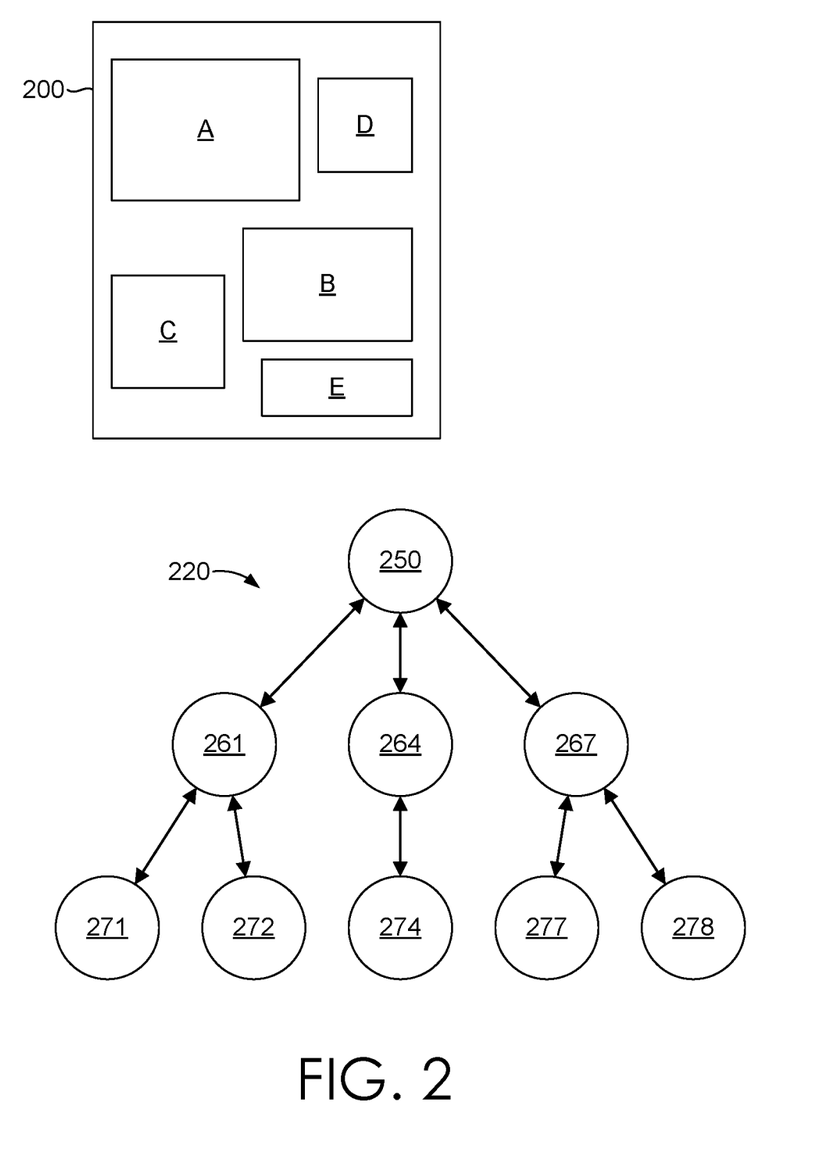
FIG. 2 illustrates an example of a document and a corresponding hierarchical structure for storing the document.

FIG. 2 shows examples of potential data structures that can be used in conjunction with a content management system. In FIG. 2, document 200 can correspond to a web page, a document in a portable document format, or another type of document that can be displayed to a user. The document 200 includes text portions A and B, video portion C, and images D and E. Component portions A-E represent separate documents that are displayed as part of document 200, but components portions A-E are can also be separately addressed/displayed. In addition to component portions A-E, document 200 may also contain other text, videos, images, audio, and/or other content that exists only as part of document 200. The document 200 and/or the component portions A-E of document 200 can be stored in any convenient manner that can allow each distinct document to have a separate file storage specification.

One storage option can be to have hierarchical storage based on the parent document, as shown in node diagram 220. Node diagram 220 can refer to storage based on nodes, storage based on directories, or any other convenient type of storage that uses a hierarchical structure. In node diagram 220, document 200 corresponds to the top level node 250. Other directories and/or nodes may be above node 250. In the node diagram 220, the level below node 250 corresponds to a node level that specifies a type of content, such as text node 261, video node 264, or image node 267. The next lower level corresponds to nodes for the content in document 200. Text portion A corresponds to node 271, text portion B corresponds to node 272, video C corresponds to node 274, image D corresponds to node 277, and image E corresponds to node 278. In a storage scheme such as the node diagram 220, document 200 (corresponding to node 250) and component portions A-E can all represent documents with separate file storage specifications.

When replication of a document is desired, the file storage specification for the document can be provided as part of a replication request. For node diagram 220, if document 200 (corresponding to node 250) is in a top level directory of drive "C", an absolute file storage specification for document 200 could be "C:/document". When document 200 is replicated, in some aspects the component portions of document 200 could also be replicated. These might be specified using a relative file storage specification based on a relationship to document 200. Thus, replication of video C could include a file storage specification of "document/video/C", which corresponds to following the node diagram 220 from node 250 down to node 274.

Figure 3:
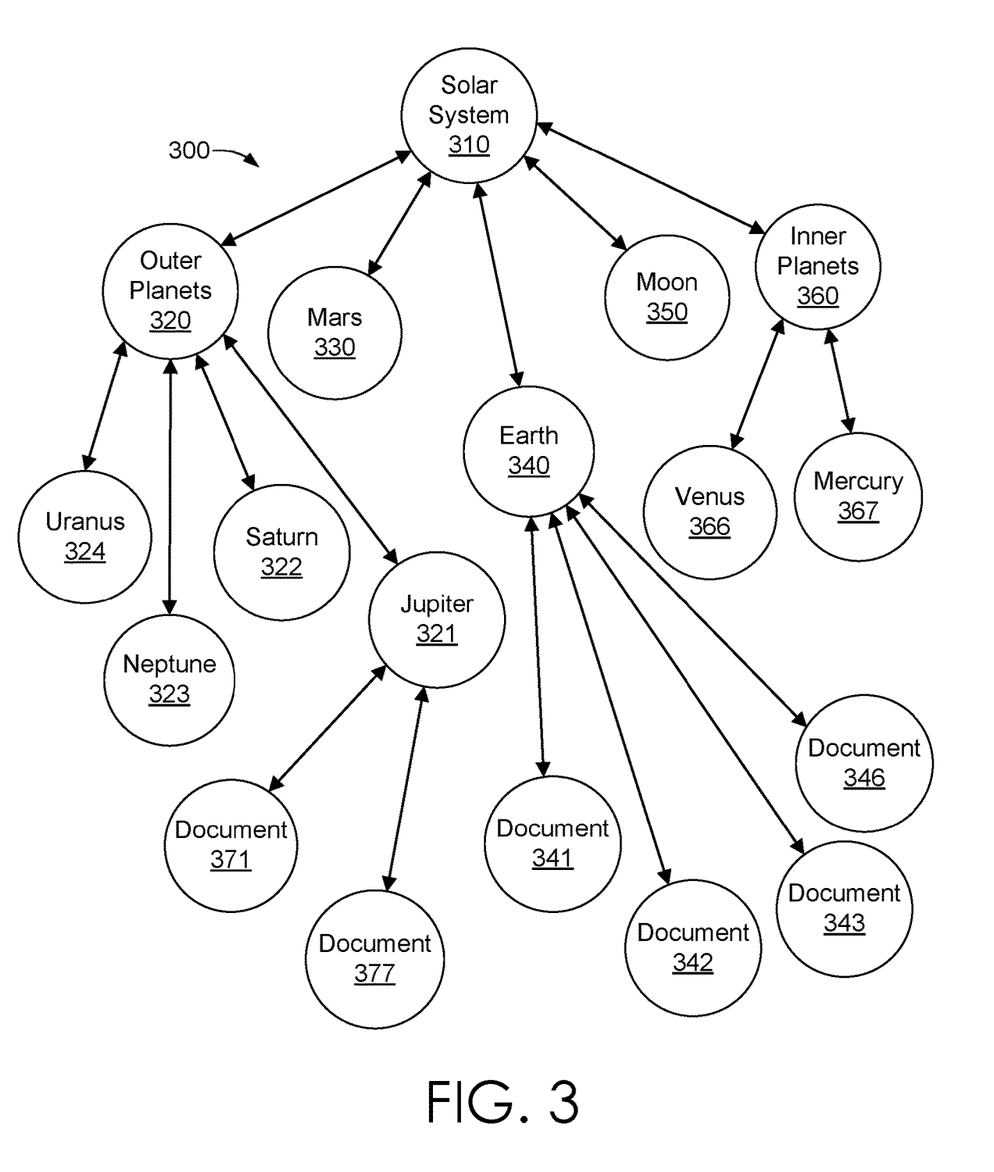
FIG. 3 illustrates an example of another hierarchical data structure.

To further illustrate the nature of semantic relationships based on replication requests, FIG. 3 shows an example of content management data structure 300 for management of content related to the solar system. In FIG. 3, data structure 300 has a top level node 310 of "solar system". This top level node 310 can correspond to the top node available on a physical device, or top level node 310 can be part of a larger hierarchical structure. The next level of nodes includes node 320 (outer planets), node 330 (mars), node 340 (earth), node 350 (moon), and node 360 (inner planets). For node 320 (outer planets) and node 360 (inner planets), a next layer of nodes corresponds to individual planets, as represented by node 321 (jupiter), node 322 (saturn), node 323 (neptune), node 324 (uranus), node 366 (venus), and node 367 (mercury).

For each node corresponding to a planet and/or for the node 350 corresponding to the moon, various documents can be stored in nodes below the planet (or moon) node. Examples of these lower level nodes are provided for node 340 (earth) and node 321 (jupiter). Nodes 341, 342, 343, and 346 represent documents available under node 340 (earth). Nodes 371 and 377 represent documents available under node 321 (jupiter). When changes are made to documents at an author instance or server, a user can replicate the changed documents to publish instances or clients.

Initially, a language model can be trained by analyzing replication requests from a plurality of replication sessions. The replication requests can be analyzed to determine relationships between the file storage specifications for replication requests received within a time window.

For the hypothetical data structure 300 shown in FIG. 3, semantic analysis of replication sessions for replication of the documents in data structure 300 can result in a variety of identified semantic relationships. For example, the document corresponding to node 377 can be related to Europa, a moon of Jupiter. When a replication session includes replication of the document corresponding to node 377, the replication session can often also include one or more documents related to node 350 (moon). As a result, after the initial training period, when a replication request is received for the document corresponding to node 377, one or more documents related to node 350 (moon) can be provided to the user for selection for replication. Depending on the semantic relationship, a replication request for node 377 could result in suggestion of all documents related to node 350, or could result in suggestion of documents related to node 350 that were part of a prior replication request.

As another example, when a replication session includes replication of at least one document from node 321, node 322, node 323, and node 324, the replication session can often also include replication of at least one document from node 330 (mars). Based on this history, semantic relationships can be identified between node 321, node 322, node 323, node 324, and node 330. Additionally or alternately, semantic relationships may be identified between certain documents under nodes 321, 322, 323, 324, and/or 330. Based on the relationships between the file storage specifications, when a replication session includes replication of at least one document from two or more of nodes 321, 322, 323, 324, and/or 330, suggestions can be provided to a user for at least one document from the remaining nodes of nodes 321, 322, 323, 324, and/or 330.

As yet another example, metadata related to documents can be used in addition to file storage specifications as words for determining semantic relationships. In this type of optional example, documents 342 and 343 can correspond to documents that include the word "moon" as part of the metadata. After an initial training period, one type of suggestion for a replication request can be to suggest to a user replication of documents 342 and 343 when a request for replication of documents related to node 350 (moon) is received. Another type of suggestion can be to suggest replication of any new documents that include the metadata "moon" when a replication request is received for document 342, document 343, or documents related to node 350.

Figure 4:
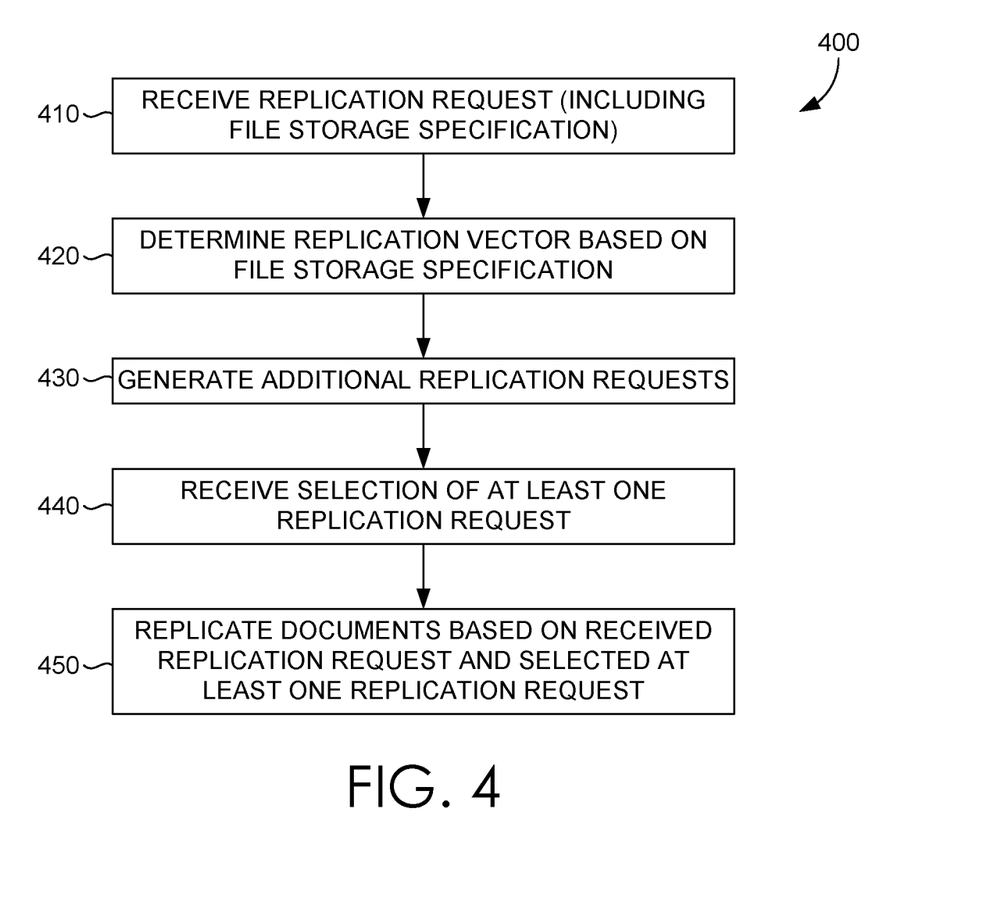
FIG. 4 illustrates a process flow depicting an example method for identifying additional replication requests based on a received replication request.

FIG. 4 shows an example of a process flow 400 for performing replication, such as replication within a content management system or environment. In FIG. 4, a replication request is received 410. The replication request can include a file storage specification such as an absolute or relative file storage specification and/or a full or partial file storage specification. A replication vector can then be determined 420 based on at least a portion of the file storage specification, such as an expanded and/or truncated version of the file storage specification in the received replication request. Optionally, a plurality of replication vectors can be determined, with the subsequent portions of this method being performed using the plurality of determined replication vectors. A plurality of additional replication requests can then be generated 430 based on the determined replication vector(s). After presenting the additional replication requests to the user, such as via a user interface, a selection of at least one replication request from the plurality of generated additional replication requests can be received 440. Documents can then be replicated 450 that correspond to the received replication request(s) and the selected at least one replication request. The documents can be replicated, for example, based on a combined replication request that includes both the received replication request and the selected at least one replication request.

Figure 5:
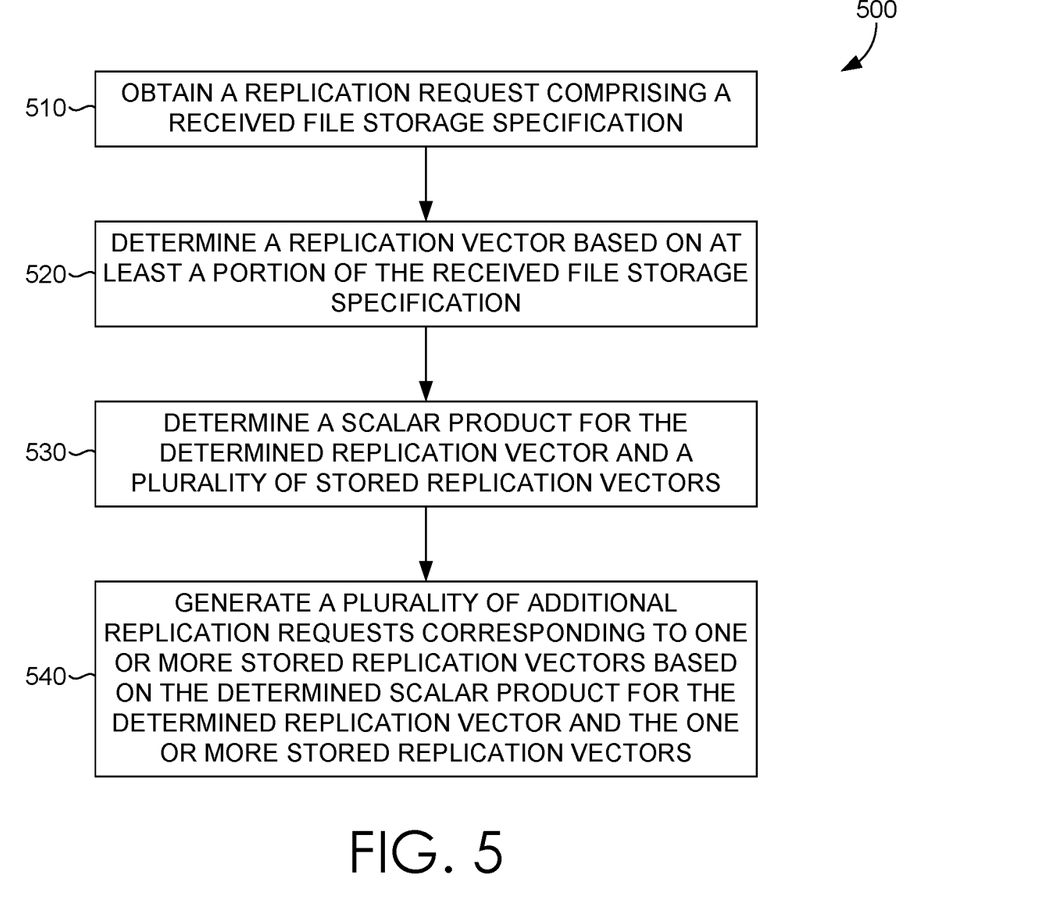
FIG. 5 illustrates a process flow depicting an example method for generating a plurality of additional replication requests based on at least a portion of a received replication request.

Looking now to FIG. 5, FIG. 5 shows an example of a process flow 500 for generating a plurality of additional replication requests based on at least a portion of a received replication request. In FIG. 5, a replication request comprising a received file storage specification is received 510. As described herein, the replication request can include a file storage specification such as an absolute or relative file storage specification and/or a full or partial file storage specification. A replication vector based on at least a portion of the received file storage specification can then be determined 520. The portion of the received file storage specification can be an expanded and/or truncated version of the file storage specification in the received replication request. In some embodiments, a plurality of replication vectors can be determined, with the subsequent portions of this method being performed using the plurality of determined replication vectors. A scalar product can then be determined 530 for the determined replication vector and a plurality of stored replication vectors. A plurality of additional replication requests corresponding to one or more stored replication vectors can be generated 540. The additional replication requests can be generated based on the determined based on the scalar product for the determined replication vector and the one or more stored replication vectors.

In accordance with embodiments described herein, replication can be facilitated by generating a new instance of each document or data file in accordance with the received replication request(s). After the new instance(s) of each document or data file is generated, the instance(s) can be communicated (for instance, over network 106 of FIG. 1) to the replication server also in accordance with the received replication request(s). In some embodiments, the replication server can store the generated instance(s). In further embodiments, the replication server can store the generated instance(s) with versioning information, such that each iterative change in received instance(s) of documents or data files are tracked and maintained for subsequent retrieval.

Figure 6:
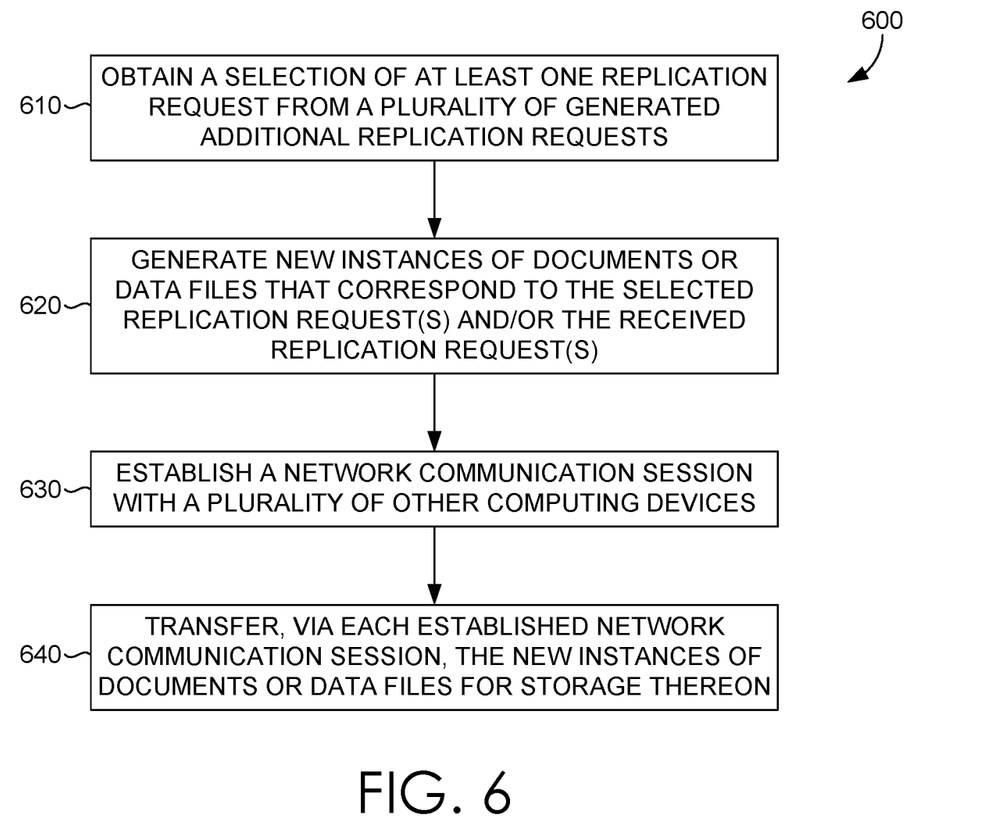
FIG. 6 illustrates a process flow depicting an example method for performing replication of documents corresponding to a received replication request and a selected at least one replication request.

In some further embodiments, the replication server can communicate the generated instance(s) to other computing devices (e.g., clients or servers) that are in communication with and/or subscribe to replication sessions with the replication server. For instance, FIG. 6 shows an example of a process flow 600 for performing replication of documents corresponding to a received replication request and a selected at least one replication request. After at least one selected replication request from a plurality of generated additional replication requests is received 610 from the user, documents or data files corresponding to the selected replication request(s) and/or the received replication request(s) can be instantiated 620 into new documents or data files that are identical or substantially similar to the corresponding documents or data files. The replication server can then initialize and establish 630 a network communication session with each of the other computing devices that are in communication with and/or subscribe to the replication sessions. To this end, upon establishing a network communication session to each of the other computing devices, the replication server can transfer 640, via the established network communication session, the new documents or data files to the other computing device. In this regard, the receiving computing devices can store the new documents or data files to memory, overwriting previous versions of the documents or data files, or saving them as new versions.

Figure 7:
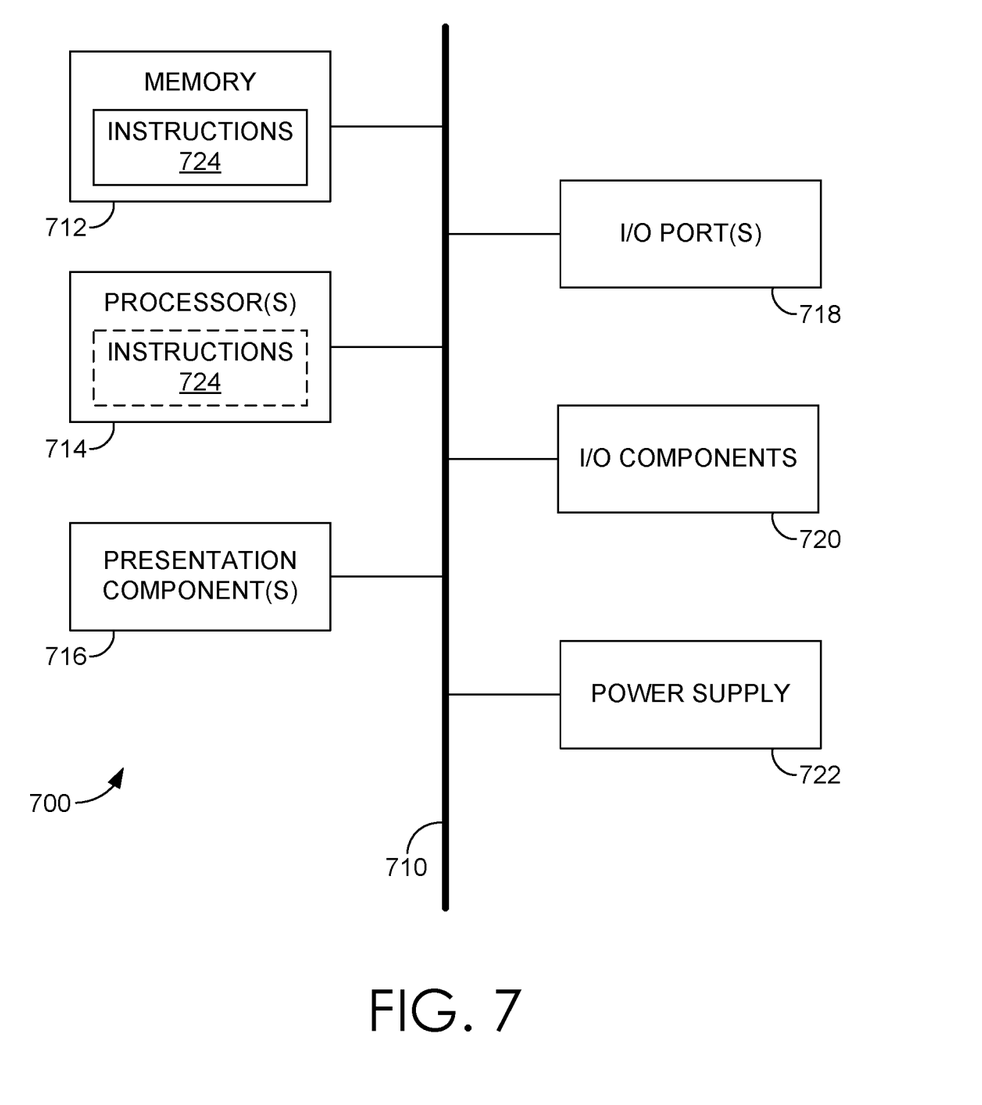
FIG. 7 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 7, an illustrative operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what may be one or more busses (such as an address bus, data bus, or combination thereof). Although the various blocks of FIG. 7 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 7 is merely illustrative of an example computing device that can be used in connection with one or more embodiments of the present disclosure. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. As depicted, memory 712 includes instructions 724. Instructions 724, when executed by processor(s) 714 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 700 includes one or more processors that read data from various entities such as memory 712 or I/O components 720. Presentation component(s) 716 present data indications to a user or other device. Illustrative presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. At least one non-transitory computer-readable storage media having instructions stored thereon, which, when executed by at least one processor of a computing device, cause the computing device to:
   receive a document replication request that includes a file storage specification;
   determine a replication vector based on a language model and at least a portion of the received file storage specification, wherein the language model is trained based on other document replication requests;
   determine a scalar product based on the replication vector and a plurality of stored replication vectors;
   generate a plurality of additional document replication requests based on the scalar product;
   replicate, to another computing device, at least one document corresponding to the document replication request and at least one replication request selected from the generated plurality of additional document replication requests.

2. The method of claim 1, wherein the received file storage specification corresponds to a storage location.

3. The media of claim 1, wherein the language model is generated based further on an order of the received plurality of other document replication requests.

4. The media of claim 1, wherein the language model is trained based further on a time proximity between the other document replication requests.

5. The media of claim 1, wherein the replication vector corresponds to at least a portion of the file storage specification.

6. A computer-implemented method, comprising:
   receiving, by a computing device, a document replication request that includes a file storage specification;

determining, by the computing device, a replication vector based on a language model and at least a portion of the received file storage specification, wherein the language model is trained based on other document replication requests;

determining, by the computing device, a scalar product based on the replication vector and a plurality of stored replication vectors;

generating, by the computing device, a plurality of additional document replication requests based on the scalar product;

replicating, by the computing device, at least one document corresponding to the document replication request and at least one document replication request selected from the generated plurality of additional document replication requests to another computing device.

7. The method of claim 6, wherein the replication vector corresponds to at least a portion of the file storage specification.

8. The method of claim 6, wherein the file storage specification corresponds to a storage location.

9. A system comprising:
a replication request generation means for generating a plurality of additional document replication requests based on
  a document replication request including at least a portion of a file storage specification,
  a replication vector determined based at least in part on a language model and the portion of the file storage specification, wherein the language model is trained based on other document replication requests, and
  a scalar product determined based on the replication vector and a plurality of stored replication vectors; and
a replication means for replicating, from a server to a client, at least one document corresponding to the document replication request and a at least one document replication request selected from the generated plurality of additional document replication requests.

10. The system of claim 9, wherein the file storage specification corresponds to a storage location.

* * * * *

UNITED STATES PATENT AND TRADEMARK OFFICE
CERTIFICATE OF CORRECTION

PATENT NO. : 11,487,709 B2
APPLICATION NO. : 16/779214
DATED : November 1, 2022
INVENTOR(S) : Tommaso Teofili et al.

It is certified that error appears in the above-identified patent and that said Letters Patent is hereby corrected as shown below:

In the Claims

In Column 14, Line 54, Claim 2, delete "method" and insert --media--.

In Column 16, Line 16, Claim 9, after "and" delete "a".

Signed and Sealed this
Thirteenth Day of December, 2022

Katherine Kelly Vidal
*Director of the United States Patent and Trademark Office*